United States Patent [19]
Wang et al.

[11] Patent Number: 5,681,899
[45] Date of Patent: Oct. 28, 1997

[54] IMPACT MODIFIER FOR POLYAMIDES CONTAINING AN ELASTOMER AND A HALOGENATED ISOOLEFIN COPOLYMER7

[75] Inventors: Hsien-Chang Wang, Bellaire, Tex.; Dongming Li, Webster, N.Y.; Thomas Chen-Chi Yu, Houston, Tex.

[73] Assignee: Exxon Chemical Patents Inc., Wilmington, Del.

[21] Appl. No.: 503,370

[22] Filed: Jul. 17, 1995

[51] Int. Cl.$^6$ ............ C08L 77/06; C08L 77/00; C08L 7/00; C08L 9/00
[52] U.S. Cl. ............ 525/232; 524/81; 525/178; 525/179; 525/183; 525/184; 525/235
[58] Field of Search ............ 525/232, 183, 525/184, 235, 178, 179; 524/81

[56] References Cited

U.S. PATENT DOCUMENTS

| | | | |
|---|---|---|---|
| 2,516,741 | 7/1950 | Young | 162/168.1 |
| 3,835,201 | 9/1974 | Fisher | 505/211 |
| 4,174,358 | 11/1979 | Epstein . | |
| 4,350,794 | 9/1982 | Moncur . | |
| 5,013,793 | 5/1991 | Wang | 525/195 |
| 5,063,268 | 11/1991 | Young | 524/286 |
| 5,162,445 | 11/1992 | Powers | 525/333.4 |
| 5,187,013 | 2/1993 | Sullivan | 428/407 |
| 5,238,990 | 8/1993 | Yu | 524/504 |
| 5,369,182 | 11/1994 | Yu et al. | 525/240 |
| 5,391,625 | 2/1995 | Arjunan | 525/215 |

FOREIGN PATENT DOCUMENTS

| | | |
|---|---|---|
| 3101771 A1 | 9/1982 | Germany . |
| 2051-547-A | 2/1990 | Japan . |
| WO 92/02582 | 2/1992 | WIPO . |

*Primary Examiner*—Fred Zitomer
*Attorney, Agent, or Firm*—Myron B. Kurtzman

[57] ABSTRACT

The invention relates to impact modifiers for polyamide compositions which improve the impact strength of the polyamides without adversely affecting the flexural modules of the composition. The impact modifiers comprise blends of general purpose rubbers and a halogenated copolymer of a $C_4$ to $C_7$ isomonoolefin and an alkylstyrene. In addition, the invention is drawn to a polyamide composition containing such impact modifiers.

10 Claims, No Drawings

IMPACT MODIFIER FOR POLYAMIDES CONTAINING AN ELASTOMER AND A HALOGENATED ISOOLEFIN COPOLYMER7

FIELD OF THE INVENTION

The present invention relates to a novel class of impact modifiers for polyamides. In addition, the invention is drawn to a polyamide composition containing such impact modifiers. The impact modifier of this invention comprises a general purpose rubber and a halogenated copolymer of a $C_4$ to $C_7$ isomonoolefin and an alkylstyrene.

BACKGROUND OF THE INVENTION

It is know that polyamides demonstrate low notched Izod impact strength. Methods for improving the impact strength of polyamides have been disclosed. For instance, U.S. Pat. No. 4,174,358 discloses a toughened multi-phase thermoplastic composition consisting of a polyamide matrix resin and a second phase consisting of polymeric particles ranging from 0.01 to 10 microns. The second phase—a branched or straight chain polymer—adheres to the polyamide matrix resin. In addition, U.S. Pat. No. 4,350,794 discloses a polyamide composition prepared by melt blending a polyamide resin and a halobutyl composition. Unfunctionalized elastomers such as general purpose rubbers are not able to toughen polyamides because they are not able to adequately interact with polyamides so as to achieve optimum size dispersed phases and strong interfacial bonding.

A need exists to be able to toughen polyamides with elastomers such as general purpose rubbers.

Improved toughened polyamide compositions have been found which employ a blend comprising nonfunctionalized elastomers such as general purpose rubbers and a halogenated copolymer of a $C_4$ to $C_7$ isomonoolefin and a para-alkystyrene as an impact modifier.

SUMMARY OF THE INVENTION

In accordance with the present invention there is provided a polymer blend useful as an impact modifier for polyamide compositions, the blend comprising:

(a) a halogen-containing copolymer of a $C_4$ to $C_7$ isomonoolefin and a para-alkylstyrene; and (b) an unfunctionalized elastomer such a general purpose rubber.

The blend forms either a core-shell dispersed phase in a polyamide matrix with an inner core of elastomer and an outer shell or halogenated copolymer, or a misable phase of (a) and (b).

DETAILED DESCRIPTION OF INVENTION

The present invention is directed towards a composition suitable for toughening polyamides.

The impact modifier of this invention forms dispersed phases in the polyamide matrix. It consists of a core-shell type morphology wherein the outer shell consists of a halogenated copolymer and the inner core consists of a general purpose rubber. The diameter of such impact modifiers is most preferably between about 0.25 to about 2 microns, preferably 0.4 to 0.6 microns.

The Elastomer

Such rubbers comprise natural rubber and synthetic rubbers. Suitable synthetic rubbers are homopolymers and copolymers of conjugated dienes which include polyisoprene, styrene butadiene rubber, styrene-isoprene rubber, neoprene or polychloroprene, butyl rubber, nitrile rubber and polybutadiene as well as mixtures thereof. The Mooney viscosity at 100° C. (ML 1+4) of such rubbers is generally between about 20 to about 150. (Mooney viscosity as referred to herein is measured in accordance with ASTM D-1646.)

The natural rubber for use in the present invention preferably has a Mooney viscosity at 100° C. (ML 1+4) of from about 30 to about 120, more preferably about 30 to about 65. The bulk of commercially available natural rubber consists of cis-1,4-polyisoprene. Generally between 93 to 95% by weight of natural rubber is cis-1,4-polyisoprene.

Included within the group of natural rubber is Malaysian rubber such as SMR CV, SMR 5, SMR 10, SMR 20, and SMR 50 and mixtures thereof. Oil extended natural rubber may further be used in various grades. The raw rubber portion may be either a latex or remilled-type rubber. Aromatic or non-staining cycloparaffinic oils are typically used at 10, 25 and 30% by weight.

Polyisoprene rubber which is essentially identical in structure with natural rubber may also be used. Polyisoprene, like natural rubber, may be comprised of all cis-polyisoprene with 1,4-addition structure. It could also differ from natural rubber in relative mounts of 1,4- and 1,3-addition structure. In addition to poly (cis-1,4 isoprene), other forms of polyisoprene may be used—trans-1,4 and trans-3,4 of high purity as well as the poly-1,2 structure such as that obtained in conjunction with the other three structures.

Polybutadiene may also be employed as the general purpose rubber. Polybutadiene, an addition polymerization product, may be a 1,4-addition product and can be of a cis-1,4 or trans-1,4 structure. Participation of a single double bond results in a vinyl or 1,2-addition. The two 1,4 structures contain backbone unsaturation whereas the two 1,2-polybutadienes contain pendant unsaturation. The Mooney viscosity of polybutadiene rubber as measured at 100° C. (ML 1+4) preferably ranges from about 40 to about 70, more preferably about 45 to about 65, and most preferably about 50 to about 60.

Further useful as a general purpose rubber is neoprene, also known as chloroprene. This rubber, composed of 2-chloro-1,3-butadiene units, typically consists of a linear sequence of predominantly trans-1,4 structure with small mounts of cis-1,4, 1,2 and 3,4 polymerization. The trans-1,4 and cis-1,4 structures have backbone unsaturation. The 1,2 and 3,4 structures further often have pendant unsaturation. Such polymers are generally prepared by free-radical emulsion polymerization.

In addition, nitrile rubbers—random emulsion polymers of butadiene and acrylonitrile—may be employed. Such polymers are well known in the art and typically vary in acrylonitrile proportions from about 15 to about 60% by weight.

Further, styrene-butadiene rubber may be used as the general purpose rubber. Such copolymers are well known in the art and consist of styrene units as well as any of the three butadiene forms (cis-1,4 trans-1,4, and 1,2 or vinyl). Such copolymers of styrene and butadiene may be randomly dispersed mixtures of the two monomers or block copolymers. Typically, styrene-butadiene copolymers contain from about 10 to about 90, preferably from about 30 to about 70 weight percent of conjugated diene.

The butyl rubber useful in this invention refers to a vulcanizable rubbery copolymer containing, by weight, from about 85 to 99.5% combined isoolefin having from 4 to 8 carbon atoms. Such copolymers and their preparation are well known in the art.

Preferably the butyl rubber has an isobutylene content of from about 95 to 99.5 weight percent. The preferred Mooney viscosity of the butyl rubber useful in the invention as measured at 125° C. (ML 1+4) range from about 20 to about 80, more preferably about 25 to about 55, most preferably about 30 to about 50.

The conjugated diene is preferably butadiene or isoprene. Such butyl rubbers may further be halogenated by means known in the art. The halogenated copolymer should preferably contain at least about 0.5 weight percent of combined halogen but not more than about one atom of chlorine or three atoms of bromine per double bond present in the original copolymer. Preferably, it contains from about 0.5 to about 2 weight percent of chlorine or from about 0.5 to about 5 weight percent bromine. Most preferably, it contains from about 1.0 to about 1.5 weight percent chlorine or from about 1.0 to about 2.5 weight percent bromine. The halogenated isobutylene-isoprene copolymer rubber can also contain more than one halogen in its structure, e.g., chlorine and bromine.

When two general purpose rubbers are employed in the present invention, a suitable weight ratio of from about 100 to 1 to 1 to 100 is acceptable. It is possible to use more than two of such general purpose rubbers.

The Halogen Copolymer

The shell of the impact modifier of this invention comprises a halogenated copolymer of a $C_4$ to $C_7$ isomonoolefin and an alkylstyrene. Halogen-containing copolymers of a $C_4$ to $C_7$ isomonoolefin and alkylstyrene are useful in the blends of this invention. The suitable halogenated copolymers comprise between from about 0.5 to about 20 weight percent, preferably from about 1 to about 20 weight percent, more preferably 2.0 to about 20 weight percent, of the alkylstyrene units. The halogen content of the copolymer may range from above zero to about 7.5 weight percent, preferably from about 0.1 to about 7.5 weight percent.

The Mooney viscosity at 125° C. (ML 1+8) of such halogenated copolymers is typically between from about 20 to about 55, preferably from about 25 to 45, most preferably from about 30 to about 35.

Such halogenated copolymers, as determined by gel permeation chromatography (GPC), have narrow molecular weight distributions and substantially homogeneous compositional distributions, or compositional uniformity. Such copolymers include the alkylstyrene moiety represented by the formula:

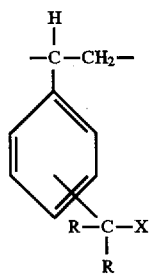

in which each R is independently selected from the group consisting of hydrogen, alkyl preferably having from 1 to 5 carbon atoms, primary haloalkyl having from 1 to 5 carbon atoms, secondary haloalkyl preferably having from 1 to 5 carbon atoms, and mixtures thereof and X is selected from the group consisting of bromine, chlorine and mixtures thereof. The preparation of these polymers are well known as disclosed in U.S. Pat. No. 5,162,445. Preferably, the isomonoolefin is isobutylene and the alkylstyrene is halogenated methylstyrene wherein the halogen is bromine. The para-isomer is particularly preferred.

The halogenated copolymer for use in this invention is produced by halogenating an isobutylene-alkylstyrene copolymer using bromine in normal alkane (e.g., hexane or heptane) solution utilizing a bis azo initiator, e.g., AIBN or VAZO 52 (2,21-azobis(2,4 dimethylpentane nitrile)), at about 55° C. to 80° C. for a time period ranging from about 4.5 to about 30 minutes, followed by a caustic quench. The recovered polymer is then washed in basic water wash and water/isopropanol washes, recovered, stabilized and dried. At least about 95 weight percent of the resulting halogenated copolymer for use in this invention has a halogenated alkylstyrene content within about 10 weight percent, and preferably within about 7 weight percent, of the average alkylstyrene content for the overall composition, and preferably at least 97 weight percent of the copolymer product has an alkylstyrene content within about 10 weight percent and preferably about 7 weight percent, of the average alkylstyrene content for the overall composition.

Substitution of Portion of the Unfunctionalized Elastomer

The unfunctionalized elastomer used in this invention may be partially substituted with an inorganic filler which is capable of minimizing the decrease in modulus and heat distortion temperature of the polyamide matrix. Such fillers include carbon black, carbon fibers, glass fibers, amorphous silica, asbestos, calcium silicate, aluminum silicate, magnesium carbonate, calcium carbonate, kaolin, chalk, talc, quartz, mica, feldspar, etc.

The impact modifiers of the invention may comprise between 85 and 32.5 weight percent halogenated copolymer and 15 and 65.5 weight percent general purpose rubber, preferably about 75 to 40 weight percent halogenated copolymer and 25 to 60 weight percent general purpose rubber, most preferably 65 to 30 weight percent copolymer and 35 to 70 weight percent elastomer. (Where the optional polyolefin is employed, the relative amount of the combination of general purpose rubber and halogenated copolymer follows the stated limitations for the general purpose rubber.)

The impact modifiers of the invention may be prepared by blending the halogenated copolymer with the general purpose rubber (and optional polyolefin) in a high shear mixer such as a two-roll mill, banbury mixer or twin-screw extruder to form a masterbatch.

Typically, where a batch mixer is used, the halogenated copolymer is first masticated. The general purpose rubber (and optional polyolefin) is then added and the components are mixed for approximately five to ten minutes until the mixture is discharged. Where polyolefin is present with the general purpose rubber, the mixing is most desirably carried out above the melting point of the polyolefin. After the discharge materials are cooled, they are ground into pellets.

Where a twin-screw extruder is used, the halogenated copolymer is first ground into pellets. The halogenated copolymer is then dry-blended with the general purpose rubber (and optional polyolefin). The dry-blended pellets are then fed into the feeding throat of the pre-warmed twin-screw extruder. The extruded strands are then cooled in a water bath and reduced to the desired pellet size. The masterbatch is preferably dried to eliminate surface moisture before compounding with the polyamide.

Morphological analysis of the impact modifier of this invention demonstrates a core-shell type dispersed phase of general purpose rubber (with optional polyolefin) forming the core of the impact modifier. The halogenated copolymer encapsulates the inner core and thereby forms the outer shell of the modifier. The morphology of the impact modifier of this invention is formed in-situ. Such modifiers provide toughened polyamides of high notched Izod impact strength. Further, the interaction of the halogenated copolymer outer shell with the polyamide prevents the impact modifier from exuding to the surface of the polyamide.

Polyamides suitable for use in this invention comprise crystalline or resinous high molecular weight solid polymers including copolymers and terpolymers having recurring polyamide units within the polymer chain. Preferably, the polyamide used in the invention is either a semi-crystalline or amorphous resin having a molecular weight of at least 5,000 and commonly referred to as nylons. Both fiber forming and molding grade nylons are suitable. Examples of such polyamides are polycaprolactam (nylon-6), polylaurylactam (nylon 12), polyhexamethyleneadipamide (nylon 6,6), polyhexamethylene-azelamide (nylon 6,9), polyhexamethylenesebacamide (nylon 6,10), polyhexamethyleneisophthalamide (nylon 6, IP) and the condensation product of 11-aminoundecanoic acid (nylon-11); partially aromatic polyamide made by polycondensation of meta xylene diamine and adipic acid such as the polyamides having the structural formula:

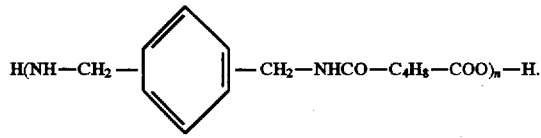

The polyamide for use in this invention may further be prepared by the copolymerization of two of the above polymers or terpolymerization of the above polymers or their components, e.g., for example, an adipic, isophthalic acid hexamethylene diamine copolymer.

Additional examples of polyamides are described in Kirk-Othmer, Encyclopedia of Chemical Technology, v. 10 page 919, and Encyclopedia of Polymer Science and Technology, Vol. 10, pages 392–414. Commercially available thermoplastic polyamides are advantageously used in the practice of this invention, especially those having a softening point or melting point between 160° C. to 275° C.

Typically, the weight ratio of impact modifier to polyamide in the polyamide compositions is less than 40:60, preferably less than 30:70, and most preferably less than or equal to 20:80. The impact modifier may be melt-blended with the polyamide. Preferably, the polyamide is in pelletized form and is dried prior to admixing it with the impact modifier. In a particularly preferred embodiment, the polyamide and impact modifier are melt blended in a twin-screw extruder. The extruder strands are cooled and then reduced in a pelletizer.

The polyamide compositions of the invention may further be modified by one or more conventional additives such as stabilizers and inhibitors of oxidative, thermal and ultraviolet light degradation; lubricants and mold release agents, colorants including dyes and pigments, fibrous and particulate fillers and reinforcements, nucleating agents, plasticizers, processing aids, etc.

The stabilizers can be incorporated into the composition at any stage in the preparation of the polyamide composition. Preferably the stabilizers are included early to preclude the initiation of degradation before the composition can be protected. Such stabilizers must be compatible with the composition.

The oxidative and thermal stabilizers useful in the materials of the present invention include those used in addition polymers generally. They include for example, up to 1 percent by weight, based on the weight of polyamide composition of Group I metal halides, e.g., sodium, potassium, lithium with cuprous halides, e.g., chloride, bromide, iodide, hindered phenols, hydroquinones, and varieties of substituted members of those groups and combinations thereof.

The ultraviolet light stabilizers, e.g., up to 2.0 percent, based on the weight of the polyamide composition, can also be those used in addition polymers generally. Examples of ultraviolet light stabilizers include various substituted resorcinols, salicylates, benzotriazoles, benzophenones, and the like.

Suitable lubricants and mold release agents, e.g., up to 1.0 percent, based on the weight of the polyamide composition are stearic acid, stearic alcohol, stearamides; organic dyes such as nigrosine, etc., pigments, e.g., titanium dioxide, cadmium sulfide, cadmium sulfide selenide, phthaocyanines, ultramarine blue, carbon black, etc.; up to 50 percent, based on the weight of the composition, of fibrous and particulate fillers and reinforcements, e.g., carbon fibers, glass fibers, amorphous silica, asbestos, calcium silicate, aluminum silicate, magnesium carbonate, calcium carbonate, kaolin, chalk, talc, powdered quartz, mica, feldspar, etc.; nucleating agents, e.g., talc, calcium fluoride, sodium phenyl phosphinate, alumina, and finely divided polytetrafluoroethylene, etc.; plasticizers, up to about 20 percent, based on the weight of the composition, e.g., dioctyl phthalate, dibenzyl phthalate, butyl benzyl phthalate, hydrocarbon oils, N-normal butyl benzene sulfonamide, ortho and para toluene ethyl sulfonamide, etc. The colorants (dyes and pigments) can be present in an amount of up to about 5.0 percent by weight, based on the weight of the polyamide composition.

EXAMPLES

The following non-limiting examples, and comparative data, bring out the more salient features of the inventions. All parts are given in terms of weight units except as otherwise indicated.

Properties and test performance data set forth below were measured as follows:

Mooney viscosity of the designated copolymers was measured in accordance with ASTM D 1646 - ML (1+8) 125° C.

Izod Impact Test—The specimens prepared were stored in metal cans before they were tested. Notched Izod impact test (NI) was conducted according to ASTM D256 at room temperature (20° C.), 0° C. and −20° C. The instrument used was a Wiedemann® pendulum impact tester. The average values from at least five specimens were reported. For the tests at 0° C. and −20° C. the specimens were immersed in an isopropanol/dry-ice mixtures pre-adjusted to the desired temperature. Temperature equilibration was assumed after ten minutes of immersion. Specimens were loaded on the tester and immediately tested. The entire process took less than ten seconds so the temperature drop was negligible.

The components used in the examples and Demonstration Examples are:

EXXPRO™ A is a halogenated copolymer of para-methylstyrene and isobutylene comprising 4.7 weight percent of para-methylstyrene and 95.3 weight percent isobutylene and which further contains 0.35 weight percent bromine (as measured by X-ray fluorescence). The copolymer exhibits a Mooney viscosity of 30.

EXXPRO™ B is a halogenated copolymer of para-methylstyrene and isobutylene comprising 5.0 weight percent of para-methylstyrene and 95.0 weight percent isobutylene and which further contains 1.2 weight percent bromine (as measured by X-ray fluorescence). The copolymer exhibits a Mooney viscosity of 35 and is commercially available from Exxon Chemical Company as EMDX 89-1.

NR SMR L is natural rubber, a commercially available product of The Natural Rubber Association of Malaysia.

PA-6 is a polyamide-6 in pellet form, commercially available as CAPRON® 8209F from Allied Signal, Inc. Irganox® B-215 antioxidant, commercially available from Ciba-Geigy.

ZnO is commercially available as PROTOX® 169, a product of The Zinc Corp. of America.

EXAMPLES

The examples of the present invention, including controls, are given in Table 1.

Demonstration A is unmodified polyamide-6 (PA-6) which has low notched Izod impact strength at all three temperatures testing was done. The demonstration A is a control.

Demonstration B is a binary blend of PA-6 and poly (Isobutylene-co-p-methyl styrene) (XP-50). The XP-50, without the benzyl bromide functional group, leads to a small increase the notched Izod impact strength of the PA-6. The demonstration B is also a control, and is not a composition of the present invention. Similar to the XP-50, the general purpose rubbers used in this invention, if used alone, do not increase the notched Izod impact strength of the PA-6.

Demonstrations C and D are PA-6 modified by EXXPRO™-A and B, respectively. They are controls, and are not a composition of the present invention. They demonstrate that both EXXPRO™-A and B are very effective tougheners for the PA-6.

Demonstrations E through L are compositions of the present invention.

Demonstrations E and F are PA-6 modified by the pre-mix of EXXPRO™ and XP-50 at ratios indicated in Table 1. Although the XP-50 is not effective in toughening the PA-6, the premix of EXXPRO™-B with XP-50 at 50/50 and 70/30 are both effective toughener for the PA-6 as indicated in Table 1. This illustrated the key point of this invention: The EXXPRO™ can be combined with a polymer that is not effective in toughening PA-6 without losing its effectiveness in toughening the PA-6.

Demonstration G is a PA-6 modified by the premix of EXXPRO™-A and natural rubber. Again, the pre-mix is effective in toughening the PA-6, while the natural rubber by itself is not. Morphology study, by transmition electron microscope, showed that the pre-mix of EXXPRO™ and natural rubber forms a core-shell morphology in the PA-6 matrix, with EXXPRO™ at the shell surrounding a natural rubber core. The average particle size of the pre-mix is about the same as the EXXPRO™ dispersed phase in the PA-6. The in-situ formed core-shell structure explains the effectiveness of the EXXPRO™/natural pre-mix in toughening the PA-6.

Demonstration H is a PA-6 modified by the premix of EXXPRO™-B and polybutadiene rubber. Similar to demonstration G, the premix of EXXPRO™-B and polybutadiene rubber is effective in toughening the PA-6, although the polybutadiene rubber itself is not.

Demonstrations I, J and K are PA-6 modified by pre-mix of EXXPRO™ with styrene-butadiene rubber (SBR), butyl rubber and polyisobutylene. All three pre-mix are effective in toughening the PA-6, although SBR, butyl rubber and polyisobutylene are not effective in toughening the PA-6 by themselves.

Demonstration L is a PA-6 modified by the pre-mix of EXXPRO™, isoprene rubber and Talc. Again, the premix is effective in toughening the PA-6, although the isoprene rubber is not. The addition of Talc in this composition leads to higher stiffness (modulus), although the notched Izod impact strength is adversely affected.

| | PA6/Exxpro/GPR All Dex | | | | | | | | | | | |
|---|---|---|---|---|---|---|---|---|---|---|---|---|
| Examples | A | B | C | D | E | F | G | H | I | J | K | L |
| PA-6, Capron 8209F | 100 | 100 | 100 | 100 | 100 | 100 | 100 | 100 | 100 | 100 | 100 | 100 |
| XP-50*, 712 | | 25 | | | 12.5 | 7.5 | | | | | | |
| EXXPRO ™-A, 0.35 wt % Br | | | 25 | | | | 17.5 | | | | | |
| EXXPRO ™-B, EMDX 89-1 | | | | 25 | 12.5 | 17.5 | | 17.5 | 17.5 | 17.5 | 17.5 | 17.5 |
| NR, SMRL | | | | | | | 7.5 | | | | | |
| BR, Budene 1208 | | | | | | | | 7.5 | | | | |
| SBR, SBR-1502 | | | | | | | | | 7.5 | | | |
| Butyl, 268 | | | | | | | | | | 7.5 | | |
| PIB, Vistanex L-80 | | | | | | | | | | | 7.5 | |
| IR, Natsyn 2200 | | | | | | | | | | | | 7.5 |
| Talc, | | | | | | | | | | | | 3.75 |
| Notched Izod Impact (ft-lb/in) | | | | | | | | | | | | |
| 20° C. | 1.1 | 1.6 | 23.5 | 20.2 | 17.9 | 20.0 | 21.9 | 21.1 | 19.7 | 18.2 | 18.3 | 7.5 |
| 0° C. | 0.7 | 0.8 | 16.7 | 15.0 | 11.0 | 12.7 | 15.4 | 4.7 | 1.9 | 2.5 | 2.6 | 1.8 |
| at –20° C. | 0.8 | 1.1 | 3.0 | 3.7 | 2.4 | 2.5 | | 2.2 | 1.3 | 2.1 | 1.9 | 1.6 |
| Flexural Modulus (kpsi) | 381 | 278 | 237 | 242 | 259 | 252 | 240 | 256 | 263 | 270 | 268 | 307 |
| Tensile strength (kpsi) | 10.0 | 7.0 | 5.9 | 5.6 | 7.1 | 7.2 | 5.9 | 6.9 | 7.4 | 7.7 | 7.0 | 7.3 |
| Elongation at break (%) | 175 | 39 | 45 | 66 | 51 | 69 | 315 | 233 | 253 | 246 | 185 | 71 |

*XP-50 is poly(isobutylene-co-1,4-methylstyrene), non-brominated.

What is claimed is:

1. An impact modifier for polyamide compositions consisting essentially of a blend of:
   a) a halogenated copolymer of a $C_4$–$C_7$ isomonoolefin and an alkylstyrene; and
   b) a general purpose rubber selected from the group consisting of natural rubber, polyisoprene, styrene-butadiene rubber, styrene-isoprene rubber, neoprene, polychloroprene, butyl rubber, nitrile rubber and polybutadiene.

2. The impact modifier of claim 1 wherein said isomonoolefin is isobutylene.

3. The impact modifier of claim 2 wherein said alkylstyrene is para-halomethylstyrene.

4. The impact modifier of claim 1 wherein the weight ratio of halogenated copolymer to general purpose rubber is from about 85:15 to about 32.5:65.5.

5. The impact modifier of claim 1 further comprising a polyolefin selected from the group consisting of an elastomeric polyolefin, a crystalline polyolefin or a mixture thereof, wherein the weight ratio of polyolefin to general purpose rubber is less than or equal to 50:50.

6. A polyamide composition having improved impact resistance comprising:

a. a polyamide; and b. the impact modifier of claim 1.

7. The polyamide composition of claim 6 wherein the polyamide is selected from the group comprising nylon-6 and nylon-6,6.

8. The polyamide composition of claim 6 wherein the isomonoolefin of the halogenated copolymer is isobutylene and the haloalkylstyrene is para halomethylstyrene.

9. The polyamide composition of claim 6 wherein the impact modifier further comprises a polyolefin selected from the group consisting of an elastomeric polyolefin, a crystalline polyolefin or a mixture thereof, wherein the weight ratio of polyolefin to general purpose rubber is less than or equal to 50:50.

10. A process for preparing an impact modified polyamide, said process comprising mixing together a polyamide and an impact modifier consisting essentially of a blend of:

a) a halogenated copolymer of a $C_4$–$C_7$ isomonoolefin and an alkylstyrene, and b) a general purpose rubber selected from the group consisting of natural rubber, polyisoprene, styrene-butadiene rubber, styrene-isoprene rubber, neoprene, polychloroprene, butyl rubber, nitrile rubber and polybutadiene.

* * * * *